US005637882A

United States Patent [19]

Divigalpitiya et al.

[11] Patent Number: 5,637,882

[45] Date of Patent: Jun. 10, 1997

[54] DETECTOR PLATE FOR USE IN IMAGING SYSTEMS

[75] Inventors: Ranjith Divigalpitiya; Bimsara W. Disanayaka, both of London, Canada; William B. Robbins, Maplewood, Minn.; Earl L. Cook, Woodbury, Minn.; Keith K. McLaughlin, Eagan, Minn.

[73] Assignee: Minnesota Mining and Manufacturing Company, Saint Paul, Minn.

[21] Appl. No.: 592,405

[22] PCT Filed: Dec. 1, 1995

[86] PCT No.: PCT/US95/15676

§ 371 Date: Dec. 1, 1995

§ 102(e) Date: Dec. 1, 1995

[87] PCT Pub. No.: WO96/21887

PCT Pub. Date: Jul. 18, 1996

[30] Foreign Application Priority Data

Jan. 13, 1995 [CA] Canada .................................. 2140199

[51] Int. Cl.[6] .................................................. G01N 23/04

[52] U.S. Cl. ...................... 250/580; 250/370.09; 250/591

[58] Field of Search .............................. 250/370.09, 580, 250/591, 315.3

[56] References Cited

U.S. PATENT DOCUMENTS 3,757,069 9/1973 Reuting .................................. 200/283

3,780,288 12/1973 Dryden ................................ 250/315.3

4,176,275 11/1979 Korn et al. .......................... 250/213 R

FOREIGN PATENT DOCUMENTS 812960 5/1959 United Kingdom .

*Primary Examiner*—Carolyn E. Fields

*Attorney, Agent, or Firm*—Carolyn A. Bates; William D. Bauer

[57] ABSTRACT

A detector plate for use in a radiation imaging system includes a first conductive layer, a dielectric layer, a photoconductive layer and a second conductive layer, arranged as a stack in that order. The first conductive layer and the dielectric layer are substantially transparent to radiation energy so as to allow the energy to pass therethrough to be received by the photoconductive layer. The first conductive layer has a periphery defined by a first edge and the dielectric layer has a periphery defined by a second edge, wherein the first edge is offset inward of the second edge defining a margin between the first and second edges. In use, this margin helps inhibit electrical arcing from the first conductive layer to the second conductive layer when a high voltage is applied between these two layers. A preferred embodiment of the detector plate includes an electrically insulative barrier of silicone based Sylgard in the margin around the periphery of the first conductive layer in the form of a "dam" to further prevent arcing and resulting detector plate failure. It is also preferable to include a linear contact on the first conductive layer adapted to connect a high voltage electrode of a power supply to the first conductive layer. The first conductive layer is more stable with the linear contact, as compared to a conventional circular contact.

24 Claims, 8 Drawing Sheets

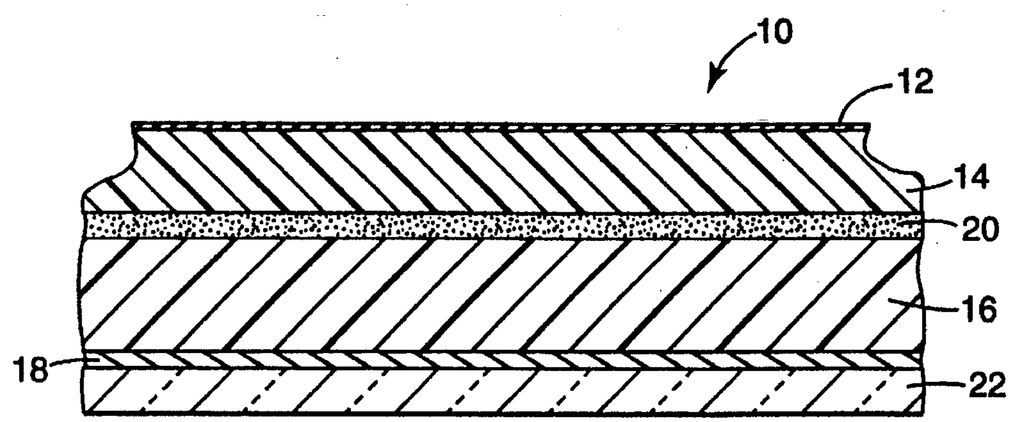
Fig. 1
PRIOR ART
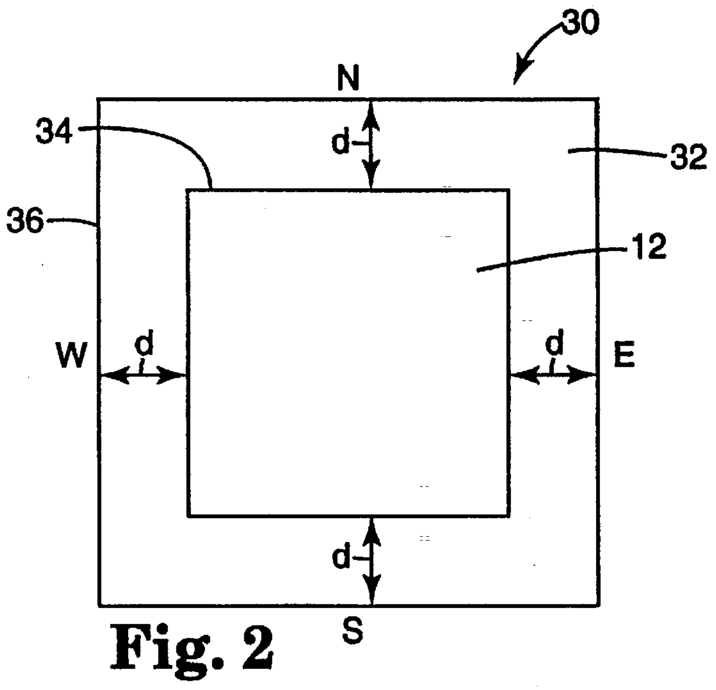
Fig. 2
| d in mm at shortest path | | | | |
|---|---|---|---|---|
| Sample | N | S | E | W |
| A | 11.2 | 10.8 | 11.8 | 9.1 |
| B | 13 | 11.2 | 12.3 | 12.3 |
| C | 4.3 | 11.7 | 11.7 | 12.2 |
| D | 4.3 | 3.9 | 3.9 | 3.6 |
| E | 2.8 | 2.8 | 4.8 | 2.7 |
Fig. 3

| Relative Humidity | Voltage kV | A | | | | B | | | | C | | | | D | | | | E | | | |
|---|---|---|---|---|---|---|---|---|---|---|---|---|---|---|---|---|---|---|---|---|---|
| | | N | W | S | E | N | W | S | E | N | W | S | E | N | W | S | E | N | W | S | E |
| 25% | 5 | | | | | | | | | | | | | | | | | X | X | | |
| | 6 | | | | | | | | | | | | | | X | | | | | | |
| | 7 | | | | | | | | | | | | | | | | | | | | |
| | 8 | | | | | | | | | | | | | | | | | | | | |
| | 9 | | | | | | | | | | | | | | | | | | | | |
| | 10 | | | | | | | | | | | | | | | | | | | | |
| 50% | 5 | | | | | X | X | X | X | X | X | X | X | | | | | | | | |
| | 6 | | | | | | | | | | | | | | | | | | | | |
| | 7 | | | | | | | | | | | | | | | | | | | | |
| | 8 | X | X | X | X | | | | | | | | | | | | | | | | |
| | 9 | | | | | | | | | | | | | | | | | | | | |
| | 10 | | | | | | | | | | | | | | | | | | | | |

Note: An "X" in a column indicates failure at the indicated voltage. Tests were not performed at voltage levels larger than the voltage level for which the plates failed, for obvious reasons.

Fig. 4

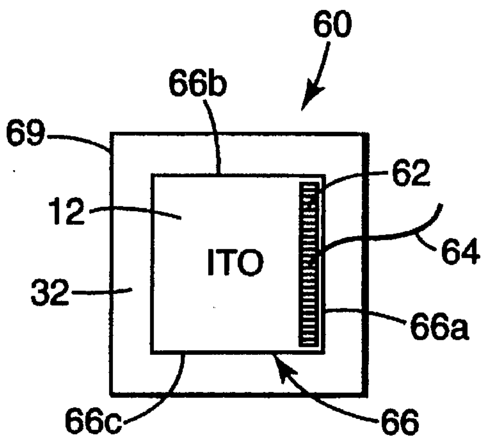
Fig. 10
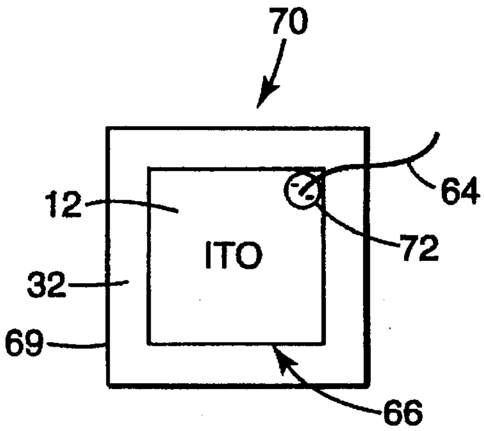
Fig. 11
| HV (KV) | # OF CYCLES |
|---|---|
| CIRCULAR PATCH CONTACT | |
| 5 | >5000 |
| 6 | 1475 |
| 7 | 750 |
| 8 | <500 |
| LINEAR CONTACT | |
| 8 | >6000 |
| 10 | >12000 |
Fig. 12
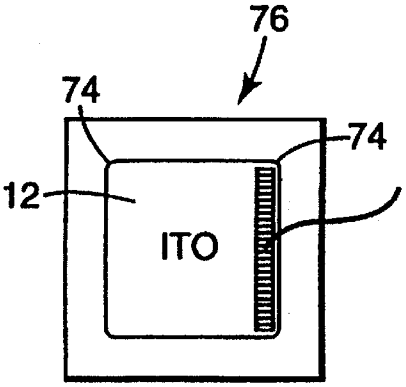
Fig. 13

DETECTOR PLATE FOR USE IN IMAGING SYSTEMS

FIELD OF THE INVENTION

This invention relates generally to radiation imaging systems and, in particular, to an improved detector plate for use in such systems.

BACKGROUND OF THE INVENTION

Conventional radiation imaging systems may utilize photoconductive materials to absorb incident radiation representative of an object. U.S. Pat. No. 4,176,275 discloses a digital x-ray imaging system in which a radiation source is positioned to direct a radiation image of an object onto the upper surface of a detector plate. The detector plate includes a suitable photoconductive material that absorbs the radiation and produces electron-hole pairs (first charge carriers) which may be separated from each other by an electric field applied across the photoconductor, creating a latent image of the object at the surface of the photoconductor which is typically a thin planar layer within the detector plate. A narrow beam of scanning radiation substantially completes discharge of the photoconductor by creating the motion of a second set of charge carders. The distribution of these second charge carders in the plane of the photoconductor is affected by the distribution of the first charge carriers, i.e., by the latent image. The motion of the second charge carriers is detected and digitized in an appropriate circuit, thereby capturing the latent image in digital form.

The detector plate is a multi-layered device having a plane parallel stack of first conductive, dielectric (insulative), photoconductive and second conductive layers. The first conductive layer provides the surface to which the radiation image is directed, and therefore both the first conductive layer and the dielectric layer must be substantially transparent to the radiation energy produced by the radiation source so that it can reach the photoconductive layer. A D.C. voltage source is connected between the first and second conductive layers, with the polarity typically being that the first conductive layer is positive with respect to the second conductive layer.

During use, large voltages of up to 10 kilovolts are applied across the sandwich structure of the detector plate, resulting in electric fields as high as 10 v/micron across the dielectric. Under the application of this high voltage and repeated use of the detector plate, the first conductive layer tends to fail electrically due to (1) cracking, and/or (2) arcing from the first conductive layer to ground which is typically the second conductive layer of the detecter plate or possibly the cassette in which the detector plate is housed. This type of arcing not only breaks down the first conductive layer but also could potentially damage the rest of the detector plate. Cracking typically occurs after repeated application of the high voltage, and can be considered as a surface "brush discharge" whereby the first conductive layer is ablated in the discharge area leaving the dielectric layer exposed.

SUMMARY OF THE INVENTION

A first aspect of the present invention provides a detector plate for use in a radiation imaging system, including a first conductive layer, a dielectric layer, a photoconductive layer and a second conductive layer, arranged as a stack in that order. The first conductive layer and the dielectric layer are substantially transparent to radiation energy so as to allow said energy to pass therethrough to be received by the photoconductive layer. The first conductive layer has a periphery defined by a first edge and the dielectric layer has a periphery defined by a second edge. The first edge is offset inward of the second edge defining a margin between the first and second edges.

A preferred embodiment of the invention includes art insulative barrier, for example silicone based Sylgard, in the margin around the periphery of the first (transparent) conductive layer, in the form of a "dam" to further prevent arcing and the resulting detector plate failure.

Instead of Sylgard, Kapton which is a polyamide film could be used as the insulative barrier. A specific brand of Kapton film suitable for this purpose is 3M Scotch Brand 92, manufactured by Minnesota Mining and Manufacturing Company, St. Paul, Minn., U.S.A.

In accordance with a second aspect of the present invention, there is provided a detector plate for use in a radiation imaging system, including a first conductive layer, a dielectric layer, a photoconductive layer and a second conductive layer, arranged as a stack in that order. The first conductive layer and the dielectric layer are substantially transparent to radiation energy so as to allow said energy to pass therethrough to be received by said photoconductive layer. A linear contact is disposed on the first conductive layer which is adapted to connect a high voltage electrode of a power supply to the first conductive layer.

Another embodiment of the detector plate preferably includes a first conductive layer having arcuated corners (i.e., rounded edges) to further reduce the possibility of cracking occurring.

BRIEF DESCRIPTION OF THE DRAWINGS

The invention will be better understood from the following description of a preferred embodiment and referring to the accompanying drawings in which:

FIG. 1 is a schematic cross-sectional side view of a prior art detector plate;

FIG. 2 is a plan view of a detector plate including a margin around the periphery of its transparent (first) conductive layer, in accordance with the present invention;

FIG. 3 is a table listing experimental margin dimensions for the detector plate according to FIGS. 2 and 2*a;*

FIG. 4 is a table listing the voltages at which failure of the various detector plates identified in FIG. 2 occurred;

FIG. 10 is a plan view of a detector plate including a linearly distributed electrical contact for the high voltage electrode, in accordance with the present invention;

FIG. 11 is a plan view of a detector plate including a conventional circular patch contact for the high voltage electrode;

FIG. 12 is a table listing the voltages and number of cycles before failure of the respective detector plates shown in FIGS. 10 and 11; and FIG. 13 is a plan view of a detector plate including arcuate corners in the transparent conductive layer, in accordance with the present invention.

DETAILED DESCRIPTION

Figure 2A:
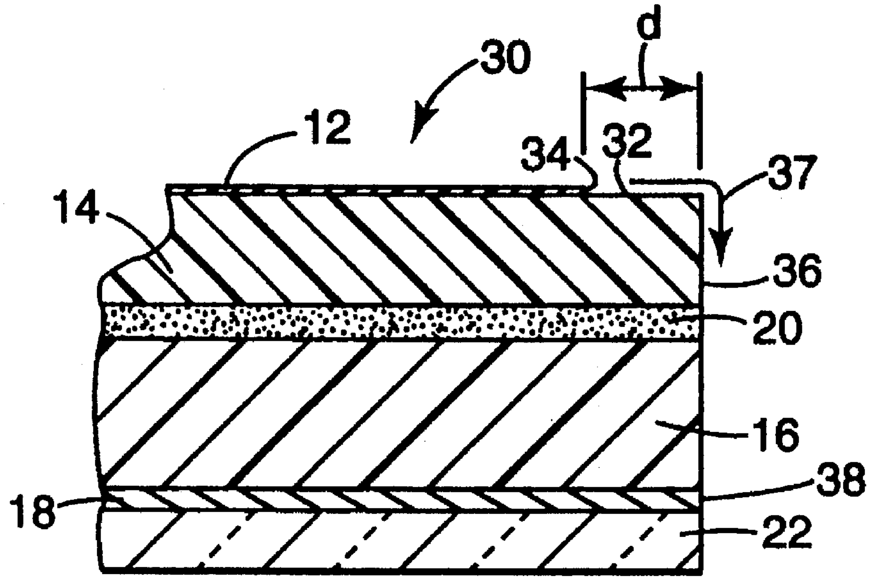
FIG. 2*a* is a schematic cross-sectional side view of a corner portion of the detector plate shown in FIG. 2.

A prior art detector plate for use in x-ray imaging systems is shown in FIG. 1. The detector plate 10 is a multi-layered device, generally rectangular in shape, comprised of a transparent (first) conductive layer 12, dielectric layer 14, photoconductive layer 16 and (second) conductive layer 18. The transparent conductive layer 12 and dielectric layer 14 are substantially transparent to radiation energy thereby enabling it to reach photoconductive layer 16.

The transparent conductive layer 12 is typically an indium-tin oxide (ITO) layer and has a thickness within the range of from about 10 nanometers to 150 nanometers. The dielectric layer 14 is preferably a polymer, such as a matte finished polycarbonate sheet, having high dielectric strength and a dielectric constant of less than 3.5. The thickness of the dielectric layer 14 is preferably about 75 μm to 250 μm and may be formed as a single layer or as a multi-layer comprising two or more separate layers. Photoconductive layer 16 is typically an amorphous selenium (Se) layer, preferably coated on a 300 nanometers thick sheet of aluminum which is conductive layer 18. An adhesive layer 20, having an average thickness of preferably less than 20 μm, binds dielectric layer 14 to photoconductive layer 16, and the conductive layer 18 is usually carded on an insulative substrate 22, such as glass.

During use, a high voltage of up to 10 kilovolts is maintained across the detector plate 10 by applying a potential difference between ITO transparent conductive layer 12 and conductive layer 18. The detector plate 10 tends to fail under application of the high voltage, as the transparent conductive layer 12 breaks down due to cracking and/or arcing from it to ground which may be either the conductive layer 18 or the cassette (not shown) within which the detector plate 10 is housed in the imaging system. Preventing arcing between transparent conductive layer 12 and conductive layer 18 is a particular concern of the present invention. As well, the invention is concerned with preventing cracking of the transparent conductive layer 12 which typically occurs as a result of repeated application of the high voltage.

Referring to FIGS. 2 and 2*a*, the detector plate 30 in accordance with the present invention is a multi-layered device similar to the prior art detector plate 10 in FIG. 1, except plate 30 also includes a margin 32 surrounding the periphery of transparent conductive layer 12. The margin 32 is defined by the width d of the gap between the peripheral edge 34 of the transparent conductive layer 12 and the peripheral edge 36 of the dielectric layer 14.

The influence of the margin 32 on arcing is more apparent from FIG. 2*a* which depicts a corner of the detector plate 30. The width d of the margin 32 in effect constitutes an increase in the distance an electrical are discharge must travel between the transparent conductive layer 12 and conductive layer 18. Since dielectric layer 14 acts an insulator, the path of any discharge, represented by arrow 37, is from transparent conductive layer 12 across the width d of margin 32 and around the periphery of dielectric layer 14 to conductive layer 18. It is therefore this effective increase in distance between layers 12 and 18 resulting from margin 32 that is influential on preventing arcing.

A study was conducted to measure the effectiveness of the margin 32 on the occurrence of arcing in a detector plate 30 which included ITO as the transparent conductive layer 12 coated on a polycarbonate sheet as dielectric layer 14. Photoconductive layer 16 was amorphous selenium and the conductive layer 18 was an aluminum sheet. Five 5"×5" (12.7 centimeters×12.7 centimeters) detector plates 30 were produced, designated as A, B, C, D and E in the table of FIG. 3, by etching away the ITO conductive layer 12 of each plate 30 to provide margins 32 of different widths d. The shortest margin width d of each of the four sides, designated N, E, W and E, of the respective detector plates is shown in the table of FIG. 3. The five detector plates 30 were monitored for electrical arcing in the following manner. The aluminum conductive layer 18 was electrically grounded, and a high voltage electrode was put in contact with the ITO conductive layer 12 of the detector plate 30. At 25% relative humidity, the voltage of the electrode was increased from 0 to 5 kilovolts and was left applied to the ITO surface of the detector plate 30 for one minute. The voltage was then increased in 1 kilovolt steps, remaining at each step for one minute until 10 kilovolts had been reached. This procedure was repeated for each of the five detector plates 30, and again at a relative humidity of 50 percent.

In FIG. 4, the table summarizes the results of this arcing experiment. These results indicate that increasing the distance from the peripheral edge 34 of the ITO transparent conductive layer 12 to the edge 36 of the dielectric layer 14 will reduce the likelihood of arcing occurring, and suggest the minimum margin width d to be about 1 cm at 50 percent relative humidity without arcing at 8 kilovolts. At higher humidity conditions that may be encountered in practice, this margin width likely would not be adequate and theoretically may be increased.

However, in practical terms, it should be understood that the cassette within which the detector plate 30 is to be housed is designed to specified ANSI standards. Given such a size restriction, providing a larger margin width d results in a smaller surface area for the transparent conductive layer 12 and thus, a decrease in the effective image area of the detector plate 30. For instance, in an 18 centimeter×24 centimeter detector plate and an 14 inch (35.56 centimeter) ×17 inch (43.18 centimeter) detector plate, the allowable maximum distance from the edge of the transparent conductive layer 12 to the detector plate edge, i.e., edge of dielectric layer 14, may be about 0.5 centimeters in order to maintain a reasonable amount of usable image area. Ideally, if no such size restriction existed, a margin 32 having any width d that was necessary to inhibit arcing could be utilized.

Figure 2B:
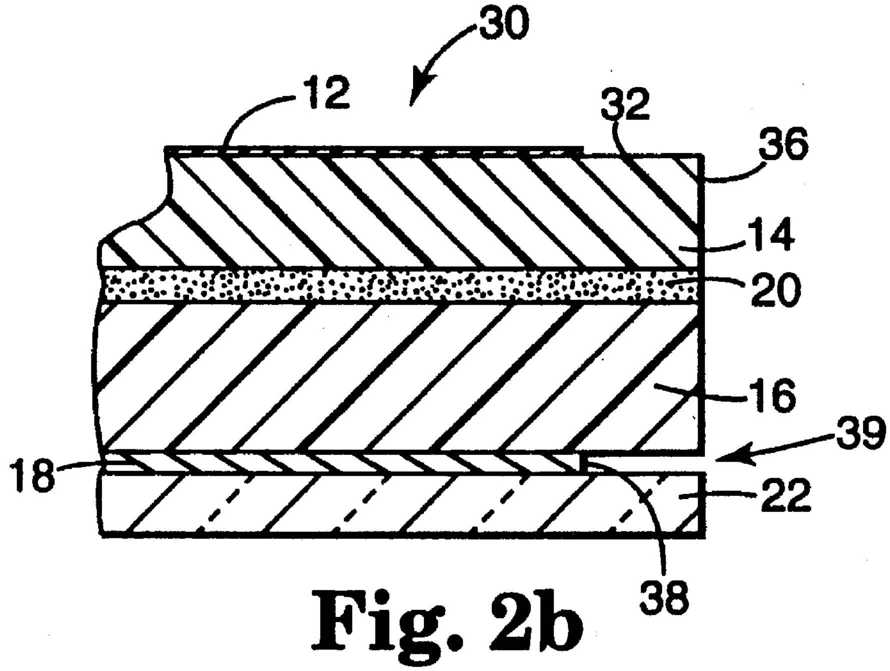
FIG. 2*b* is a schematic cross-sectional side view similar to that of FIG. 2*a* but illustrating a modification in which a second margin is provided around the periphery of the (second) conductive layer of the detector plate.
Figure 5:
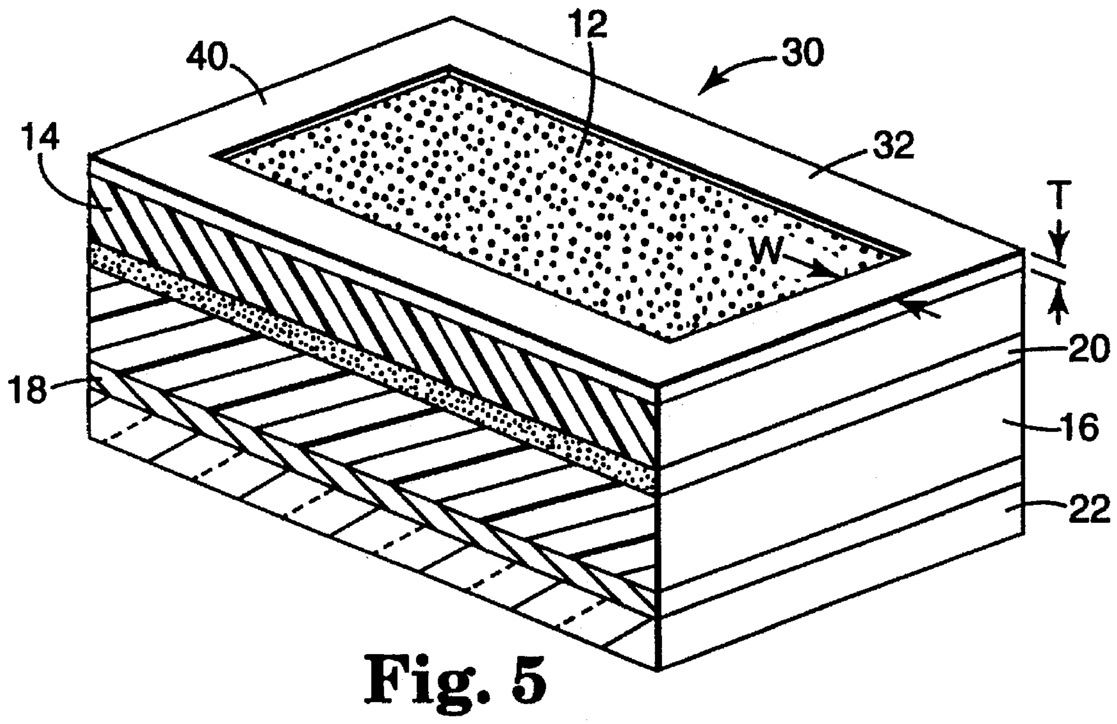
FIG. 5 is a schematic perspective sectional view of the detector plate including an electrically insulative barrier, in accordance with the invention.

FIG. 2*b* illustrates an alternative embodiment of the detector plate 30 which includes a second margin 39 surrounding the periphery of conductive layer 18, defined by the peripheral edge 38 of the conductive layer 18 being offset inward of the peripheral edge 36 of the dielectric layer 14. The second margin 39 functions to further effectively increase the distance between transparent conductive layer 12 and conductive layer 18 that an arc discharge must travel, To further inhibit the occurrence of arcing in the detector plate 30, as shown in FIG. 5, an electrically insulative barrier 40 is applied in the margin 32 around the periphery of the transparent conductive layer 12. The barrier 40 forms of a "dam" over which any are discharge must jump thereby effectively increasing the distance between layers 12 and 18. The insulative barrier 40 provides minimization of the separation width d of the ITO layer/detector plate margin 32 and therefore assists in accommodating defined cassette dimensions. Silicone based Sylgard, which is a rather flexible insulative material produced by Dow Corning, Midland, Mich., U.S.A., is the preferred material for the electrically insulative barrier 40.

Figure 6:
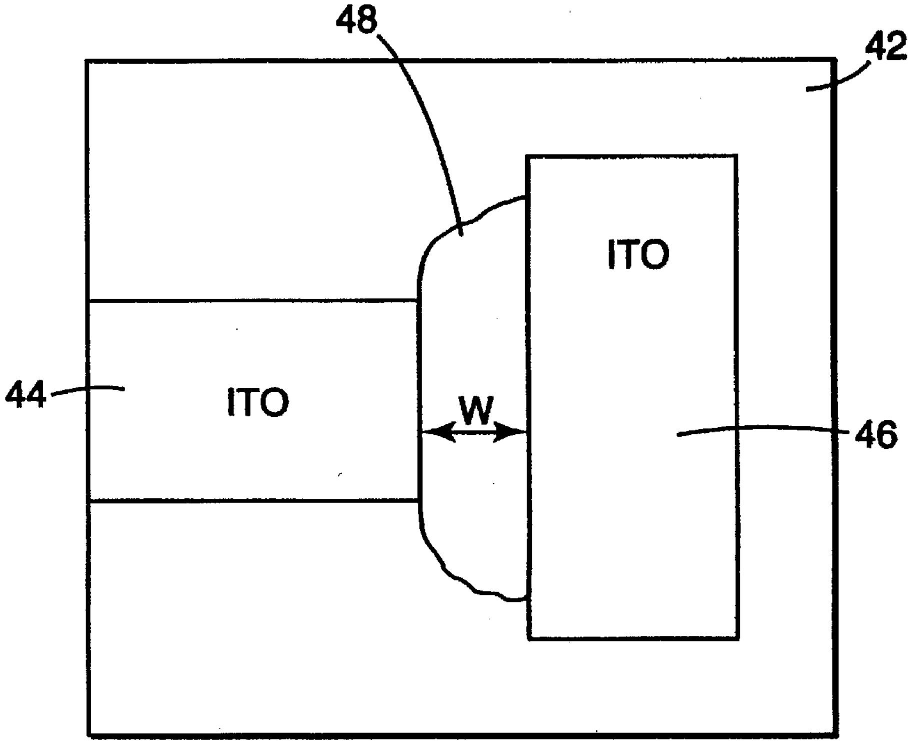
FIG. 6 is a plan view of a test structure comprising a polycarbonate film on which two ITO conductive layers are separated by a gap.

Studies were conducted in order to find the optimum conditions in terms of margin separation width and thickness of a Sylgard insulative barrier (designated as W and T respectively in FIG. 5). Referring to FIG. 6, iridium-tin oxide (ITO), which is the preferred material for transparent conductor layer 12, was coated on a polycarbonate film 42 and then etched to produce two separate ITO layers 44 and 46 having a gap width W which was varied during the experiment. A Sylgard barrier 48 was coated between the ITO layers 44 and 46, and the electrical stability of the ITO layers was then studied as a function of thickness of the Sylgard barrier 48 and humidity. A high voltage power supply (not shown) was connected to one of the ITO layers, either 44 or 46, and the other was grounded. The applied voltage was then gradually increased until discharge or ITO breakdown occurred.

Figure 7:
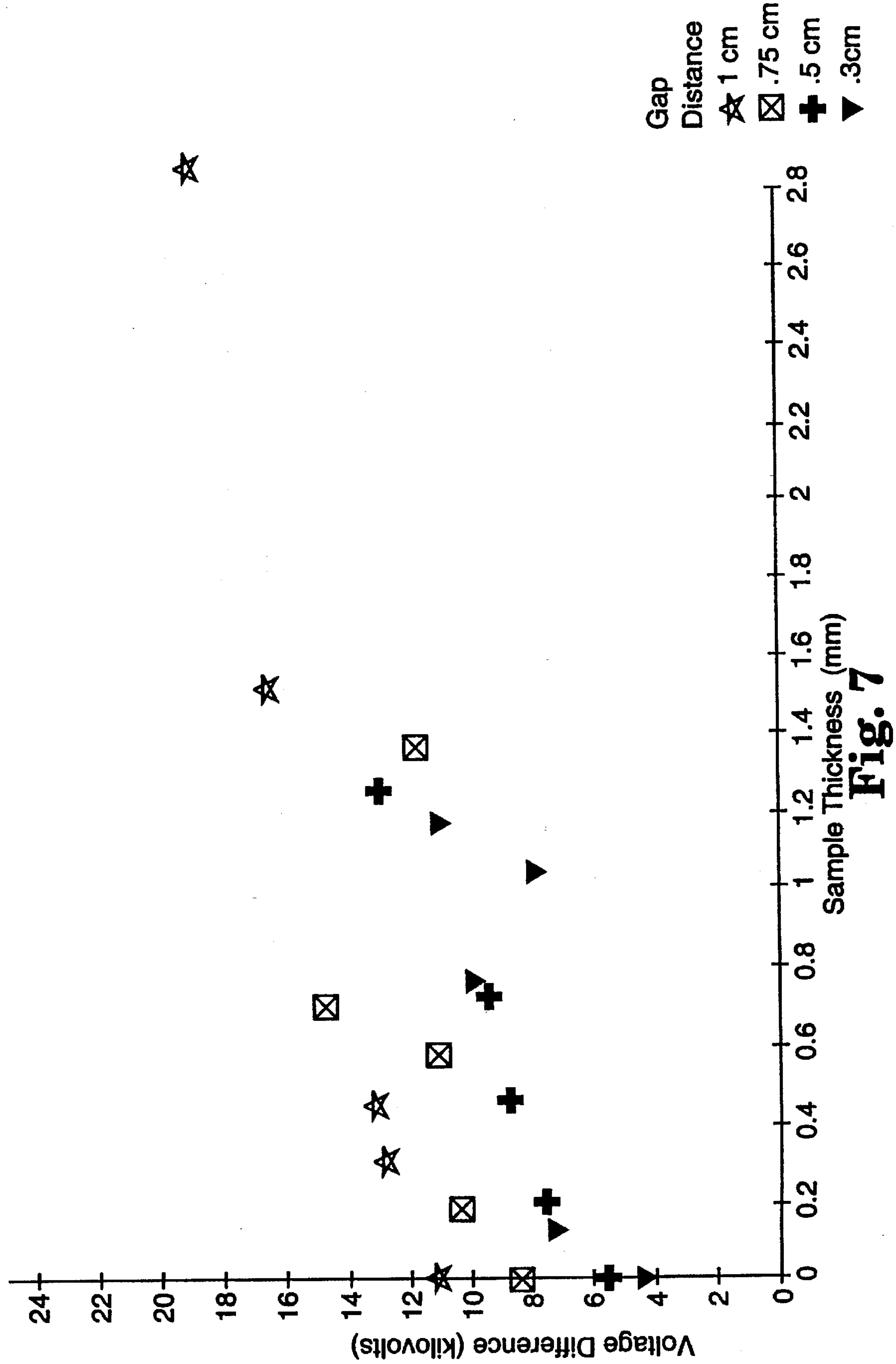
FIG. 7 is a graph of voltage difference versus Sylgard coating thickness for various gap sizes of the structure in FIG. 6.

FIG. 7 is a graph of the results from one study, showing the voltage difference at which ITO breakdown occurred for various thicknesses and gap widths of the Sylgard coating. The results indicate that a 0.3 centimeter width and 1.2 millimeter thickness of Sylgard is sufficient to prevent arcing at voltages above 10 kilovolts, at a relative humidity of 75 percent.

Figure 8:
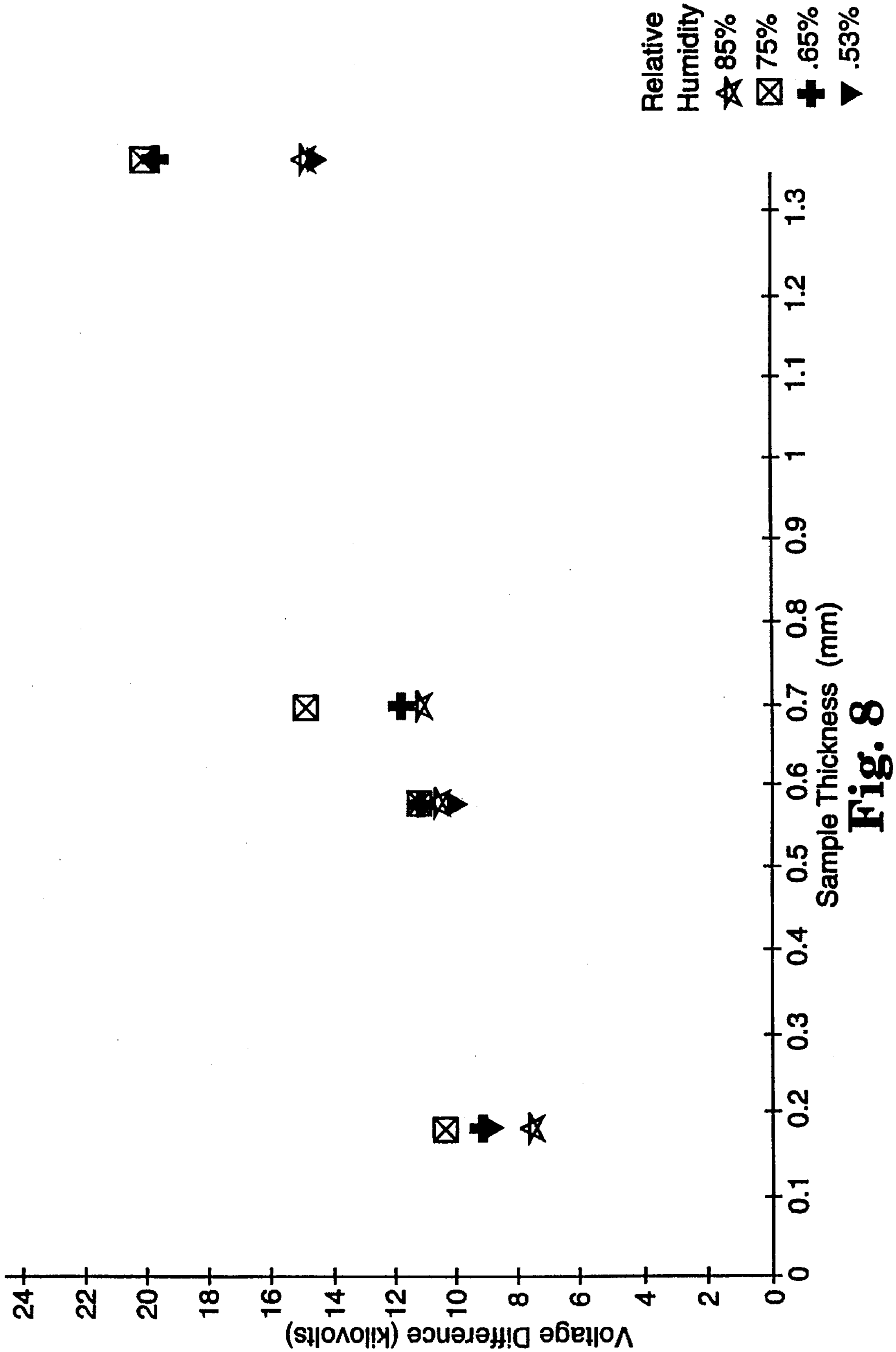
FIG. 8 is a graph of voltage difference versus Sylgard coating thickness at various relative humidities for the test structure in FIG. 6.

Since relative humidity also has an impact on the electrical failure and the ITO breakdown due to arcing, a further study was carried out in which a Sylgard barrier 48 was coated between the two ITO layers 44 and 46 keeping the gap width W constant at 0.75 centimeter. The ITO breakdown (or arcing) voltage was measured at various humidities. These results are given in FIG. 8 which reveals that a 1.2 millimeters thick Sylgard barrier 48 was sufficient to prevent arcing at voltages as high as 10 kilovolts.

Figure 9:
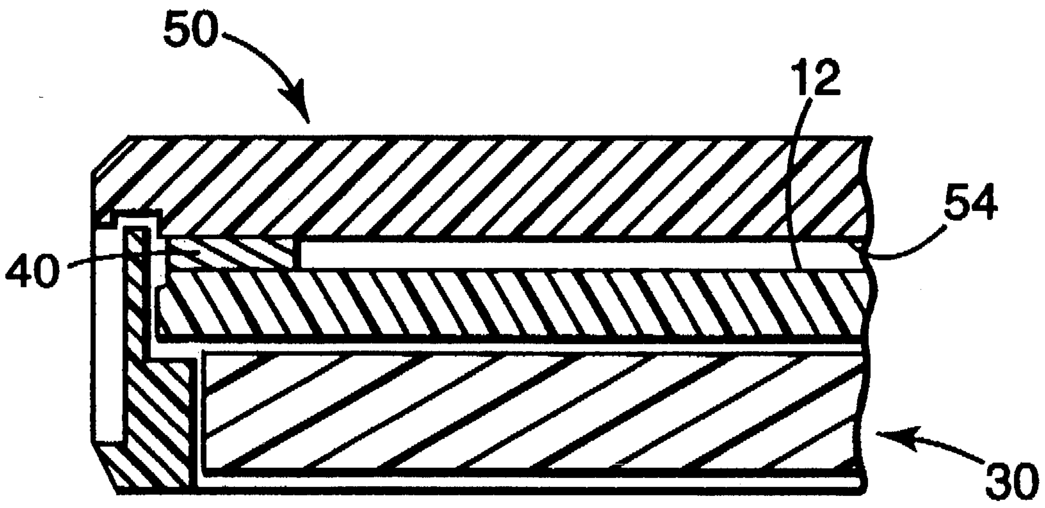
FIG. 9 is a schematic cross-sectional view of a corner of a cassette housing a detector plate.

In FIG. 9, illustrated is a cross section through a corner of a conventional cassette 50 in which is housed a detector plate 30. The cassette 50 is commonly molded out of carbon fiber filled composite materials which typically provide a surface resistance of about 200 ohms/square. Arcing possibly might occur between the transparent conductive layer 12 and the cassette cover 54, but a solution to that problem is beyond the scope of the present invention. According to current defined cassette dimensions, the maximum distance from the surface of the transparent conductive layer 12 to the cassette cover 54 is approximately 1.8 millimeters which limits the thickness of the electrically insulative barrier 40. Based on the results observed in the studies discussed above, as a minimum, a 0.3 centimeters wide and 1.2 millimeters thick Sylgard coating is capable of providing an electrically insulative barrier 40 that prevents arcing when up to a 10 kilovolts voltage difference is applied across the detector plate 30, while also being able to accommodate the 1.8 millimeters size restriction between transparent conductive layer 12 and the cassette cover 54. It is preferred that insulative barrier 40 be about 0.5 centimeters wide and 1.8 millimeters thick. In the final application, the Sylgard insulative barrier 40 may be applied after the detector plate 30 is loaded into the cassette 50, and the electrically insulative barrier 40 could function as a bumper to secure the detector plate 30 within the confines of the cassette 50.

Turning now to the concern of cracking, the embodiment of the detector plate 60 shown in FIG. 10, in accordance with the present invention, includes a linear contact 62 to connect the high voltage electrode 64 from a power supply (not shown) to the transparent conductive layer 12. The linear contact 62 is fabricated from a more conductive, less resistive material than ITO transparent conductive layer 12, and behaves as a gradient through which electrical charges flowing from the high voltage electrode 64 are dispersed into the transparent conductive layer 12. The linear contact 62 is preferably formed as a nickel chromium alloy or silver printed stripe positioned generally parallel and adjacent an edge 66*a* of the transparent conductive layer 12, and extending to near the opposing perpendicular edges 66*b* and 66*c* of layer 12, e.g. 0.25 inches (0.64 centimeters) from edges 66*b* and 66*c*.

It should be understood that the width of the linear contact 62 is restricted on the basis of current ANSI standards limiting the size of the detector plate and that materials utilized to form the linear contact 62 are typically not transparent to radiation energy. Otherwise, the linear contact may be as wide as is necessary for the particular circumstances, the width being determined by simple experimentation. Therefore, in order to minimize the amount of unusable image area on the detector plate 60, a linear contact 62 of about 2 millimeters in width is preferred.

A study was conducted to measure the effect of the linear contact 62 on preventing cracking and thus enhancing the electrical stability of the transparent conductive layer 12. Two detector plates, 60 and 70 shown in FIGS. 10 and 11 respectively, were utilized each having a 5 inch (12.7 centimeter)×5 inch (12.7 centimeter) selenium sheet as the photoconductive layer 16 laminated with ITO coated polycarbonate which represent the transparent conductive layer 12 and the dielectric layer 14 respectively. The peripheral edge 66 of the ITO coating was etched away to produce a 4 inch (10.16 centimeter)×4 inch (10.16 centimeter) square, thereby providing a separation margin 32 having a ½ inch (1.27 centimeter) width between the peripheral edge 66 of the transparent conductive layer 12 and the edge 69 of the conductive layer 18 which was a sheet of aluminum. The margin 32 is sufficiently large so as to avoid arcing within the detector plates 60, 70 under application of a high voltage in ambient conditions (i.e. 40 percent relative humidity). The high voltage electrode 64 from a power supply (not shown) is connected to the ITO transparent conductive layer 12 and the aluminum conductive layer 18 is grounded. The high voltage power supply may be switched on and off through a programmable counter/relay unit.

One detector plate 60 (FIG. 10) included a linear contact 62 of approximately 3.5 inches (8.89 centimeters) in length, connecting the high voltage electrode 64 to transparent conductive layer 12. The second detector plate 70 (FIG. 11) included a conventional circular patch contact 72 of several millimeters in diameter. The contacts 62 and 72 were made using either a silver paste or with copper conducting adhesive foils.

Each of the detector plates 60, 70 were monitored for cracking in the following manner. A high voltage was repetitively applied to the plate 60, 70 for 5 minutes and switched off for 30 seconds. With the power supply switched off, any capacitive charge stored in the detector plate 60, 70 was discharged across a 50 megohm resistor connected in parallel to the plate. The time constant of each detector plate 60, 70 was approximately 35 milliseconds, so the plates would totally discharge after 30 seconds. Each plate 60, 70 was visually observed at regular intervals to check for cracking of the ITO transparent conductive layer, while the counter unit recorded the number of cycles of voltage application.

In FIG. 12, the table summarizes the results of the cracking experiment. These results indicate that the conventional circular patch contact 72 damaged the ITO transparent conductive layer 12 with less than 600 cycles at voltages above 8 kilovolts. The distributed linear contact 62, however, yielded very high cycling life-times in excess of 12,000 cycles even at 10 kilovolts. Therefore, the transparent conductive layer 12 was found to be more stable with the linear contact 62.

Referring to FIG. 13, to further prevent break down of the transparent conductive layer 12, in particular at the corners thereof, the transparent conductive layer 12 may include smooth or arcuate corners 74. Although it would be advantageous to provide arcuate corners 74 having a larger radius, in practical terms, to accommodate more imaging area in the detector plate 76 a preferable radius is about 5 millimeters.

While the present invention has been described with respect to it preferred embodiments, it is to be recognized and understood that changes, modifications and alterations in the form and in the details may be made without departing from the scope of the following claims.

What is claimed is:

1. A detector plate for use in a radiation imaging system, comprising:

a first conductive layer;

a dielectric layer a photoconductive layer; and a second conductive layer, arranged as a stack in that order;

said first conductive layer and said dielectric layer being substantially transparent to radiation energy so as to allow said energy to pass therethrough to be received by said photoconductive layer; and said first conductive layer having a periphery defined by a first edge and said dielectric layer having a periphery defined by a second edge, wherein said first edge is offset inward of said second edge defining a margin between said first and second edges.

2. A detector plate as in claim 1 in which said margin has a minimum width of approximately 1 centimeter.

3. A detector plate as in claim 1 in which an electrically insulative barrier is positioned in said margin surrounding the periphery of said first conductive layer.

4. A detector plate as in claim 3 in which said electrically insulative barrier has a minimum width of approximately 0.3 centimeters and a minimum thickness of approximately 1.2 millimeters.

5. A detector plate as in claim 3 in which said electrically insulative barrier comprises silicone and is approximately 0.5 centimeters wide and 1.8 millimeters thick.

6. A detector plate as in claim 5 in which said margin is defined by four segments forming a rectangle, each segment having approximately the same width.

7. A detector plate as in claim 6 in which the photoconductive layer comprises amorphous selenium.

8. A detector plate as in claim 7 in which said first conductive layer comprises indium-tin oxide.

9. A detector plate as in claim 8 in which said second conductive layer has a peripheral edge which is offset inward of said second edge of said dielectric layer thereby defining a second margin.

10. A detector plate as in claim 9 including a linear contact disposed on said first conductive layer and adapted to connect a high voltage electrode of a power supply to said first conductive layer.

11. A detector plate as in claim 10 in which said detector plate is generally rectangular and said linear contact is positioned generally parallel and adjacent one edge of said first conductive layer.

12. A detector plate as in claim 11 in which said one edge has a first length and said contact has a second length, said second length being equal to or slightly less than said first length.

13. A detector plate as in claim 12 in which said linear contact is made of a highly conductive material which is of lower resistance than said first conductive layer.

14. A detector plate as in claim 13 in which said linear contact is approximately 2 millimeters wide.

15. A detector plate as claimed in claim 14 in which said first conductive layer includes arcuate corners.

16. A detector plate as in claim 15 in which said arcuate corners have a radius of approximately 5 millimeters.

17. A detector plate for use in a radiation imaging system, comprising:

a first conductive layer;

a dielectric layer;

a photoconductive layer; and a second conductive layer, arranged as a stack in that order;

said first conductive layer and said dielectric layer being substantially transparent to radiation energy so as to allow said energy to pass therethrough to be received by said photoconductive layer;

a linear contact disposed on said first conductive layer and adapted to connect a high voltage electrode of a power supply to said first conductive layer.

18. A detector plate as in claim 17 in which said detector plate is generally rectangular and said linear contact is positioned generally parallel and adjacent one edge of said first conductive layer.

19. A detector plate as in claim 18 in which said edge has a first length and said contact has a second length, said second length being equal to or slightly greater than said first length.

20. A detector plate as in claim 19 in which said linear contact is made of a highly conductive material which is of lower resistance than said first conductive layer.

21. A detector plate as in claim 20 in which said linear contact is approximately 2 millimeters wide.

22. A detector plate as in claim 21 in which the transparent conductive layer is indium-tin oxide.

23. A detector plate as claimed in claim 22 in which said first conductive layer includes arcuate corners.

24. A detector plate as claimed in claim 23 in which said arcuate corners have a radius of approximately 5 millimeters.

* * * * *